US009920634B2

United States Patent
Uskert et al.

(10) Patent No.: US 9,920,634 B2
(45) Date of Patent: Mar. 20, 2018

(54) METHOD OF MANUFACTURING A TURBOMACHINE COMPONENT, AN AIRFOIL AND A GAS TURBINE ENGINE

(71) Applicants: Rolls-Royce North American Technologies, Inc., Indianapolis, IN (US); Rolls-Royce Corporation, Indianapolis, IN (US)

(72) Inventors: Richard Christopher Uskert, Timonium, MD (US); Ted Joseph Freeman, Avon, IN (US); David John Thomas, Brownsburg, IN (US); Jay E. Lane, Mooresville, IN (US); Adam Lee Chamberlain, Mooresville, IN (US); John Alan Weaver, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 878 days.

(21) Appl. No.: 14/318,546

(22) Filed: Jun. 27, 2014

(65) Prior Publication Data
US 2014/0311163 A1    Oct. 23, 2014

Related U.S. Application Data

(63) Continuation of application No. PCT/US2012/072228, filed on Dec. 30, 2012.
(Continued)

(51) Int. Cl.
*F01D 5/18* (2006.01)
*F01D 5/28* (2006.01)
(Continued)

(52) U.S. Cl.
CPC .............. *F01D 5/18* (2013.01); *B29C 70/68* (2013.01); *B29D 99/0025* (2013.01);
(Continued)

(58) Field of Classification Search
CPC . F01D 5/18; F01D 5/181; F01D 5/182; F01D 5/183; F01D 5/184; F01D 5/185;
(Continued)

(56) References Cited

U.S. PATENT DOCUMENTS 2,648,520 A * 8/1953 Schmitt ................... F01D 5/187
                                                         29/889.721
3,825,364 A * 7/1974 Halila ..................... F01D 11/12
                                                         165/907
(Continued)

FOREIGN PATENT DOCUMENTS

EP    1 593 757 A1    11/2005

OTHER PUBLICATIONS

International Search Report and Written Opinion, PCT/US2012/072228, dated Sep. 5, 2013.
(Continued)

*Primary Examiner* — Richard Edgar
(74) *Attorney, Agent, or Firm* — Brinks Gilson & Lione

(57) ABSTRACT

One embodiment of the present invention is a unique method of manufacturing a component for a turbomachine, such as an airfoil. Another embodiment is a unique airfoil. Yet another embodiment is a unique gas turbine engine. Other embodiments include apparatuses, systems, devices, hardware, methods, and combinations for cooled gas turbine engine components. Further embodiments, forms, features, aspects, benefits, and advantages of the present application will become apparent from the description and figures provided herewith.

24 Claims, 4 Drawing Sheets

Related U.S. Application Data

(60) Provisional application No. 61/581,844, filed on Dec. 30, 2011.

(51) Int. Cl.
  *B29C 70/68* (2006.01)
  *B29D 99/00* (2010.01)
  B29L 31/08 (2006.01)

(52) U.S. Cl.
  CPC ........ *F01D 5/282* (2013.01); *B29L 2031/085* (2013.01); *F05D 2230/60* (2013.01); *F05D 2300/612* (2013.01); *Y02P 70/523* (2015.11); *Y02T 50/672* (2013.01)

(58) Field of Classification Search
  CPC .......... F01D 5/186; F01D 5/187; F01D 5/188; F01D 5/189
  See application file for complete search history.

(56) References Cited

U.S. PATENT DOCUMENTS

| | | | |
|---|---|---|---|
| 4,422,229 A | 12/1983 | Sadler et al. | |
| 4,648,921 A | 3/1987 | Nutter, Jr. | |
| 4,790,721 A | 12/1988 | Morris et al. | |
| 5,813,835 A | 9/1998 | Corsmeier et al. | |
| 6,544,003 B1 | 4/2003 | Grylls et al. | |
| 6,746,755 B2 | 6/2004 | Morrison et al. | |
| 6,827,556 B2 | 12/2004 | Simon | |
| 7,144,220 B2 | 12/2006 | Marcin et al. | |
| 7,153,096 B2 | 12/2006 | Thompson et al. | |
| 7,247,002 B2 | 7/2007 | Albrecht et al. | |
| 7,255,535 B2 | 8/2007 | Albrecht et al. | |
| 7,905,016 B2 | 3/2011 | James et al. | |
| 7,967,568 B2 * | 6/2011 | Dalton | F01D 5/187 415/115 |
| 8,980,435 B2 * | 3/2015 | de Diego | F01D 5/282 416/241 B |
| 2005/0238491 A1 | 10/2005 | Morrison et al. | |
| 2005/0249602 A1 * | 11/2005 | Freling | F01D 5/187 416/241 B |
| 2006/0251515 A1 | 11/2006 | Landis | |
| 2008/0250641 A1 | 10/2008 | James et al. | |

OTHER PUBLICATIONS

Extended European Search Report, dated Sep. 12, 2016, pp. 1-9, issued in European Patent Application No. 12872171.9, European Patent Office, Munich, Germany.

* cited by examiner

METHOD OF MANUFACTURING A TURBOMACHINE COMPONENT, AN AIRFOIL AND A GAS TURBINE ENGINE

CROSS REFERENCE TO RELATED APPLICATIONS

The present application is a continuation of PCT Application No. PCT/US2012/072228, filed Dec. 30, 2012, which claims the benefit of U.S. Provisional Patent Application No. 61/581,844 filed Dec. 30, 2011, each of which is incorporated herein by reference.

FIELD OF THE INVENTION

The present invention relates to gas turbine engines, and more particularly, to airfoils and other cooled components for gas turbine engines.

BACKGROUND

Cooled gas turbine engine components that are cooled by cooling fluids, such as a gas turbine engine airfoil cooled by cooling air, remain an area of interest. Some existing systems have various shortcomings, drawbacks, and disadvantages relative to certain applications. Accordingly, there remains a need for further contributions in this area of technology.

SUMMARY

One embodiment of the present invention is a unique method of manufacturing a component for a turbomachine, such as an airfoil. Another embodiment is a unique airfoil. Yet another embodiment is a unique gas turbine engine. Other embodiments include apparatuses, systems, devices, hardware, methods, and combinations for cooled gas turbine engine components. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
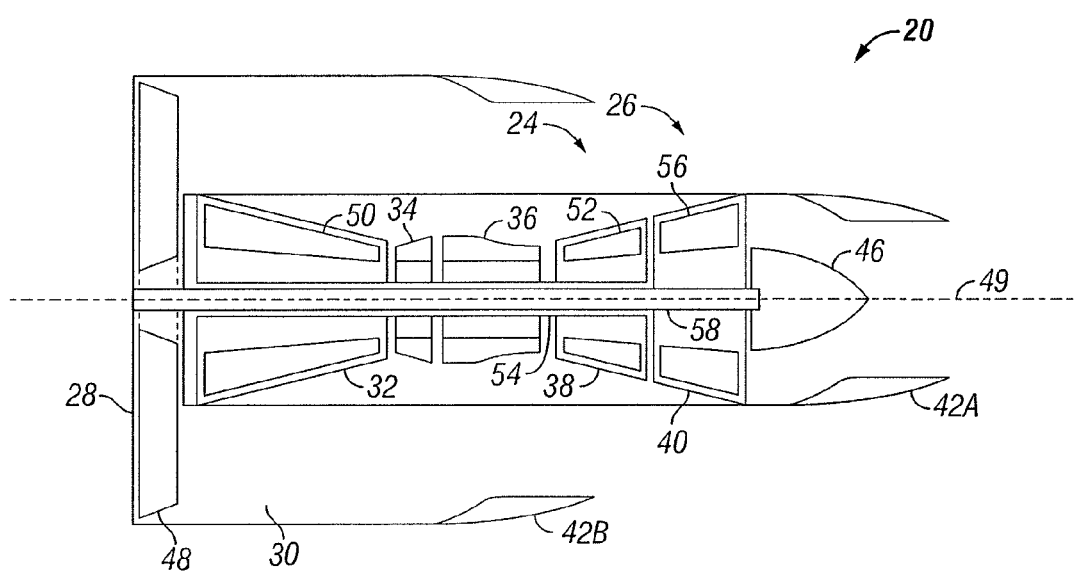
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, there are illustrated some aspects of a non-limiting example of a gas turbine engine 20 in accordance with an embodiment of the present invention. In one form, engine 20 is a propulsion engine, e.g., an aircraft propulsion engine. In other embodiments, engine 20 may be any other type of gas turbine engine, e.g., a marine gas turbine engine, an industrial gas turbine engine, or any aero, aero-derivative or non-aero gas turbine engine. In one form, engine 20 is a two spool engine having a high pressure (HP) spool 24 and a low pressure (LP) spool 26. In other embodiments, engine 20 may include only a single spool, or may include three or more spools, e.g., may include an intermediate pressure (IP) spool and/or other spools. In one form, engine 20 is a turbofan engine. In other embodiments, engine 20 may be any other type of gas turbine engine, such as a turboprop engine, a turboshaft engine, a propfan engine, a turbojet engine or a hybrid engine. As a turbofan engine, LP spool 26 is coupled to and operative to drive a propulsor 28 in the form of a turbofan (fan) system, which may be referred to as a turbofan, a fan or a fan system. As a turboprop engine, LP spool 26 powers a propulsor 28 in the form of a propeller system (not shown), e.g., via a reduction gearbox (not shown). As a propfan engine, LP spool 26 powers a propulsor 28 in the form of a propfan. In other embodiments, propulsor 28 may take other forms, such as one or more helicopter rotors or tilt-wing aircraft rotors, for example, powered by one or more engines 20 in the form of one or more turboshaft engines.

In one form, engine 20 includes, in addition to fan 28, a bypass duct 30, a compressor 32, a diffuser 34, a combustor 36, a high pressure (HP) turbine 38, a low pressure (LP) turbine 40, a nozzle 42A, a nozzle 42B, and a tailcone 46, which are generally disposed about and/or rotate about an engine centerline 49. In other embodiments, there may be, for example, an intermediate pressure spool having an intermediate pressure turbine. In one form, engine centerline 49 is the axis of rotation of fan 28, compressor 32, turbine 38 and turbine 40. In other embodiments, one or more of fan 28, compressor 32, turbine 38 and turbine 40 may rotate about a different axis of rotation.

In the depicted embodiment, engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor 32 are in fluid communication with fan 28. Nozzle 42B is in fluid communication with bypass duct 30. Diffuser 34 is in fluid communication with compressor 32. Combustor 36 is fluidly disposed between compressor 32 and turbine 38. Turbine 40 is fluidly disposed between turbine 38 and nozzle 42A. In one form, combustor 36 includes a combustion liner (not shown) that contains a continuous combustion process. In other embodiments, combustor 36 may take other forms, and may be, for example, a wave rotor combustion system, a rotary valve combustion system, a pulse detonation combustion system, a continuous detonation combustion system or a slinger combustion system, and may employ deflagration and/or detonation combustion processes.

Fan system 28 includes a fan rotor system 48 driven by LP spool 26. In various embodiments, fan rotor system 48 may include one or more rotors (not shown) that are powered by turbine 40. In various embodiments, fan 28 may include one or more fan vane stages (not shown in FIG. 1) that cooperate with fan blades (not shown) of fan rotor system 48 to compress air and to generate a thrust-producing flow. Bypass duct 30 is operative to transmit a bypass flow generated by fan 28 around the core of engine 20. Compressor 32 includes a compressor rotor system 50. In various embodiments, compressor rotor system 50 includes one or more rotors (not shown) that are powered by turbine 38. Compressor 32 also includes a plurality of compressor vane stages (not shown in FIG. 1) that cooperate with compressor blades (not shown) of compressor rotor system 50 to compress air. In various embodiments, the compressor vane stages may include a compressor discharge vane stage and/or one or more diffuser vane stages.

Turbine 38 includes a turbine rotor system 52. In various embodiments, turbine rotor system 52 includes one or more rotors (not shown) coupled to and operative to drive compressor rotor system 50. Turbine 38 also includes a plurality of turbine vane stages (not shown in FIG. 1) that cooperate with turbine blades (not shown) of turbine rotor system 52 to extract power from the hot gases discharged by combustor 36. Turbine rotor system 52 is drivingly coupled to compressor rotor system 50 via a shafting system 54. Turbine 40 includes a turbine rotor system 56. In various embodiments, turbine rotor system 56 includes one or more rotors (not shown) coupled to and operative to drive fan rotor system 48. Turbine 40 also includes a plurality of turbine vane stages (not shown in FIG. 1) that cooperate with turbine blades (not shown) of turbine rotor system 56 to extract power from the hot gases discharged by turbine 38. Turbine rotor system 56 is drivingly coupled to fan rotor system 48 via a shafting system 58. In various embodiments, shafting systems 54 and 58 include a plurality of shafts that may rotate at the same or different speeds and directions for driving fan rotor system 48 rotor(s) and compressor rotor system 50 rotor(s). In some embodiments, only a single shaft may be employed in one or both of shafting systems 54 and 58. Turbine 40 is operative to discharge the engine 20 core flow to nozzle 42A.

During normal operation of gas turbine engine 20, air is drawn into the inlet of fan 28 and pressurized by fan rotor 48. Some of the air pressurized by fan rotor 48 is directed into compressor 32 as core flow, and some of the pressurized air is directed into bypass duct 30 as bypass flow. Compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive compressor 32 and fan 28 via respective shafting systems 54 and 58. The hot gases exiting turbine 40 are discharged through nozzle system 42A, and provide a component of the thrust output by engine 20.

Gas turbine engine 20 employs many airfoils in the form of blades and vanes in order to pressurize, expand and/or direct the flow of air and/or combustion products in and through engine 20. The airfoils are used in fan 28, compressor 32 and turbines 38 and 40. Some of the airfoils operate at high temperatures, for which cooling may be desired, e.g., the latter vane and/or blade stages of compressor 32 and some or all stages of turbines 38 and 40 e.g., depending on the particular application and operating temperatures associated therewith. In addition, other gas turbine engine components operate at high temperatures, and may require cooling, for example but without limitation, flowpath wall structures, struts and other stationary or rotating components. It is desirable that the airfoils and other components be light in weight, e.g., in order to reduce the weight of gas turbine engine 20. Accordingly, embodiments of the present invention envision, among other things, airfoils and other components formed entirely or partially of a composite material and having one or more composite foam cooling passages. By using composite foam cooling passages, structural integrity of the airfoil is increased, e.g., relative to cooling passages that are devoid of structure, since the composite foam has load bearing capacity, and high surface area for heat transfer from the airfoil to the cooling fluid. The term, "composite foam," as used herein, relates to foams, e.g., open cell foams, formed of one or more composite materials, monolithic ceramic (for example and without limitation, SiC and/or SiN), a heterogeneous ceramic, or other nonmetallic materials. Although embodiments are described herein as with respect to airfoils for gas turbine engines, the present application also envisions embodiments pertaining to airfoils for other types of turbomachinery, as well as other types of cooled components for any type of machinery or equipment in addition to gas turbine engines.

Figure 2:
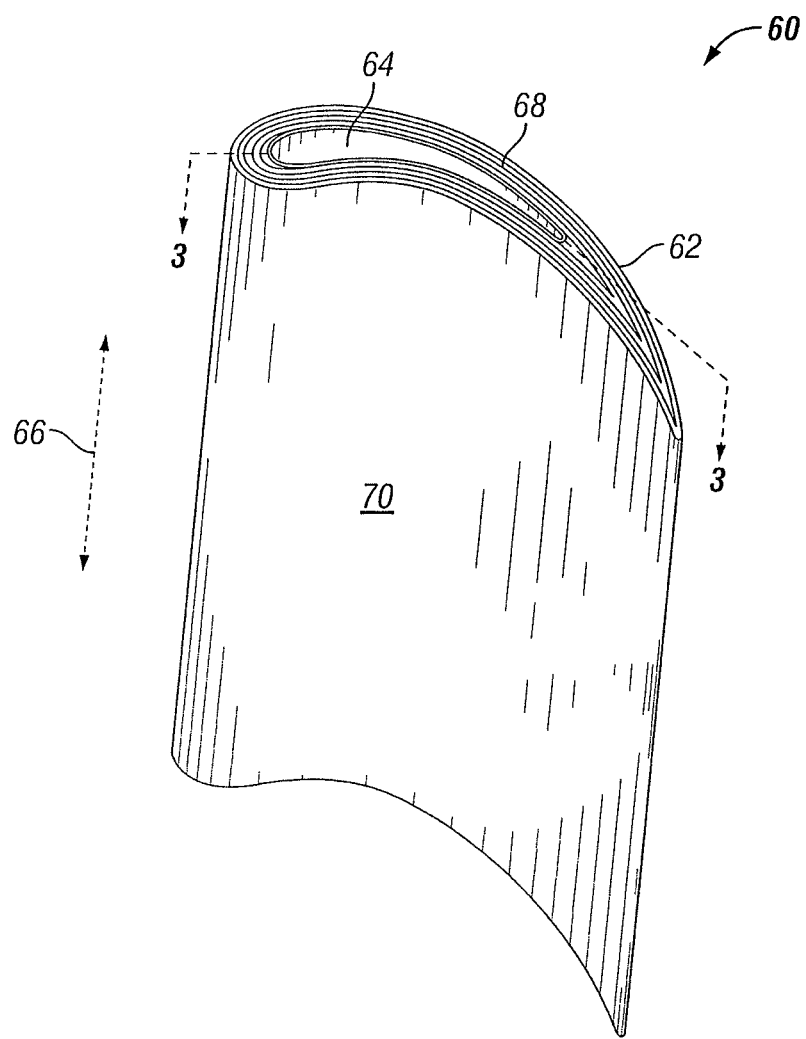
FIG. 2 depicts some aspects of a non-limiting example of an airfoil having a composite foam cooling passage in accordance with an embodiment of the present invention.

Referring to FIG. 2, some aspects of a non-limiting example of a component 60 in accordance with an embodiment of the present invention are depicted. In one form, component 60 is an airfoil, referred to herein as airfoil 60. In other embodiments, component 60 may be one or more of any other turbomachine or engine 20 component types. For example, component 60 may be any component utilized in compressor 32, combustor 36, HP turbine 38, LP turbine 40 and/or any other section or portion of gas turbine engine 20. In various embodiments, component 60 may be, for example and without limitation, a bladetrack, a seal segment, a combustor liner, a vane endwall, a platform, a shroud, a strut and/or any other gas turbine engine component, e.g., which might require cooling during the operation of engine 20.

In one form, airfoil 60 includes an external portion 62 and an internal portion 64, the latter of which is only generically depicted in FIG. 2. In various embodiments, internal portion 64 may extend entirely or partially through external portion 62 in a spanwise direction 66. In one form, external portion 62 is formed of a composite material. In other embodiments, external portion 62 may be formed of a monolithic material. In one form, external portion 62 is a ceramic matrix composite (CMC). In other embodiments, external portion 62 may be one or more of another type of composite material in addition to or in place of CMC, for example and without limitation, a functionally graded ceramic or an organic matrix composite (OMC). In one form, external portion 62 is formed by enveloping internal portion 64 with a plurality of composite wrap plies 68 to form an airfoil body 70 into a desired shape, e.g., an airfoil shape, e.g., by wrapping composite wrap plies 68 around internal portion 64 and otherwise stacking composite wrap plies 68 in such a manner as to yield an airfoil shape around internal portion 64. Removable core support pins are not employed to support internal portion 64. Body 70 is then rigidized, e.g., fired in a suitable atmosphere, to form airfoil 60. In various embodiments, internal portion 64 includes one or more composite portions that may be rigidized at the same time as external portion 62 and/or before rigidization of external portion 62, e.g., one or more composite foam structures that form one or more composite foam cooling passages, as set forth below, and in some embodiments, one or more composite filler tape and/or composite filler fabric portions.

Figure 3:
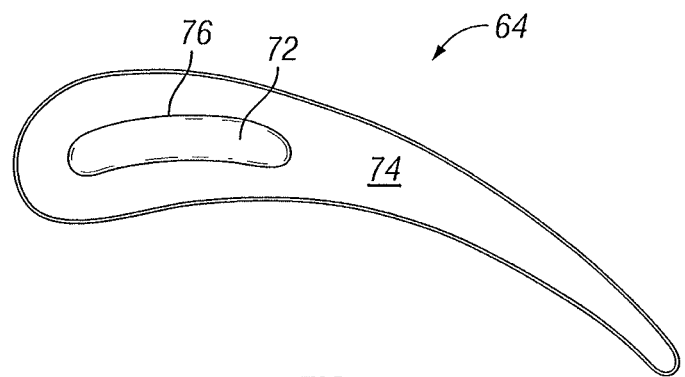
FIG. 3 depicts some aspects of a non-limiting example of a top view of the airfoil of FIG. 2 in accordance with an embodiment of the present invention

Referring to FIG. 3 in conjunction with FIG. 2, some aspects of a non-limiting example of internal portion 64 in accordance with an embodiment of the present invention are depicted. For the purpose of simplicity of illustration, external portion 62 is not depicted in FIG. 3. In various embodiments, internal portion 64 includes one or more composite foam structures. In the embodiment depicted in FIG. 3, internal portion 64 includes a single composite foam structure 72. Other embodiments may include multiple composite foam structures 72. In one form, internal portion 64 also includes a composite filler 74 surrounding the length of composite foam structure 72 in spanwise direction 66. Removable core support pins are not employed to support composite foam structure 72. In various embodiments, composite filler 74 may surround substantially all of or only part of composite foam structure 72. For example, in some embodiments, part of composite foam structure 72 may be in direct contact with external portion 64. In other embodiments, internal portion 64 may not employ a composite filler, such as composite filler 74.

Composite foam structure 72 forms a composite foam cooling passage, and is configured to pass a cooling fluid therethrough, e.g., air. In one form, composite foam structure 72 is a CMC foam. In other embodiments, composite foam structure 72 may be one or more of another type of composite material in addition to or in place of CMC, for example and without limitation, an OMC. Composite foam structure 72 is formed into a desired shape, i.e., the desired shape of all or a portion of a composite foam cooling passage.

The shape of composite foam structure 72 may vary with the needs of the application, and includes simple shapes, e.g., an airfoil-like shape extending into internal portion 64, as depicted in FIG. 3, to complex shapes, including, for example, serpentine shapes and/or other complex shapes, yielding cooling passages that direct cooling fluid in two or three dimensions. In one form, composite foam structure 72 is rigidized prior to the rigidization of external portion 62. In other embodiments, composite foam structure 72 may be rigidized at the same time as external portion 62. In one form, composite foam structure 72 extends all the way through external portion 62 in spanwise direction 66. In other embodiments, composite foam structure 72 may extend only partially through external portion 62.

In one form, composite filler 74 is a ceramic tape. In some embodiments, ceramic fabric may be employed in addition to or in place of ceramic tape. In other embodiments, other types of composite filler may be employed. In one form, composite filler 74 is a CMC filler. In other embodiments, composite filler 74 may be one or more of another type of composite material in addition to or in place of CMC, for example and without limitation, an OMC.

Composite filler 74 is applied and/or stacked onto composite foam structure 72, e.g., about its entire periphery 76. In some embodiments, the entire periphery 76 may not be surrounded by composite filler 74. In one form, periphery 76 is surrounded by composite filler 74 along the entire length of composite foam structure 72 (which is approximately perpendicular to the plane of view of FIG. 3) but does not close off the ends of composite foam structure 72, thereby allowing cooling fluid to pass into, through and out of composite foam structure 72 from one end to the other. In some embodiments, composite filler 74 is also applied and/or stacked onto one or more ends of composite foam structure 72, e.g., to limit or prevent the flow of cooling fluid into or out of one or both ends of the composite foam structure. In some embodiments, composite filler 74 may not be applied and/or stacked along the entire length of composite foam structure 72.

Figure 4:
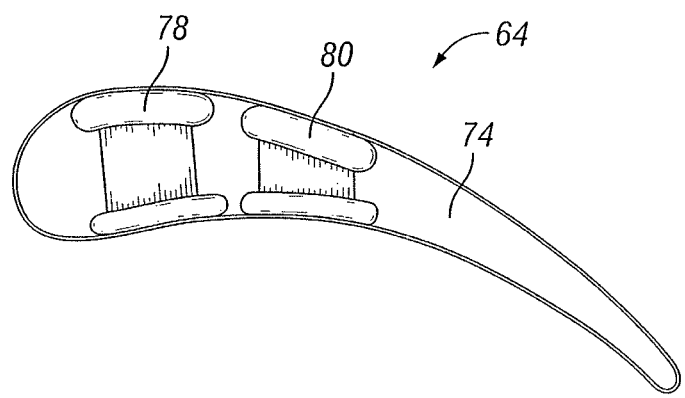
FIGS. 4 and 5 depict some aspects of a non-limiting example of an airfoil having a composite foam cooling passage in accordance with an embodiment of the present invention.
Figure 5:
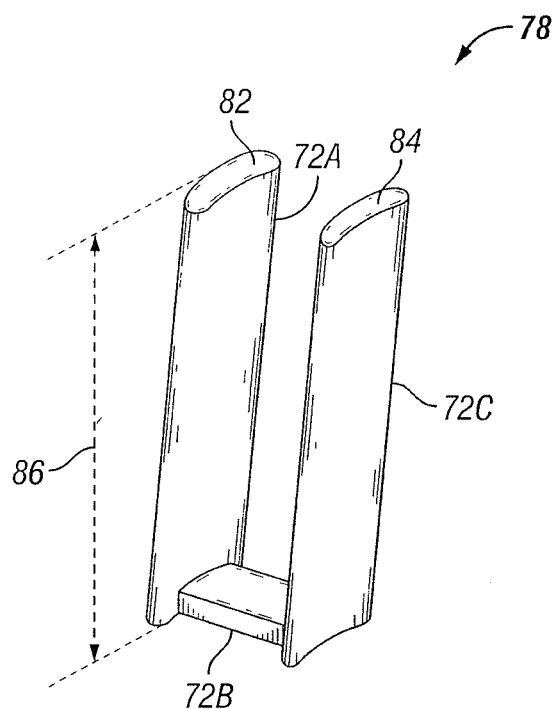

Referring to FIGS. 4 and 5 in conjunction with FIG. 2, some aspects of another non-limiting example of internal portion 64 in accordance with an embodiment of the present invention are depicted. For the purpose of simplicity of illustration, external portion 62 is not depicted in FIG. 4. The view of FIG. 4 is from the same perspective as that of FIG. 3. In the embodiment of FIG. 4, internal portion 64 includes a composite foam cooling passage 78, a composite foam cooling passage 80 and composite filler 74. Composite foam cooling passage 78 is depicted in FIG. 5, wherein composite filler 74 is not illustrated for clarity. Composite foam cooling passage 80 is similar to composite foam cooling passage 78, and hence, the description of composite foam cooling passage 78 applies equally to composite foam cooling passage 80.

In one form, composite foam cooling passage 78 is a serpentine passage formed of three composite foam structures 72A, 72B and 72C, each of which are formed into desired shapes and configured to pass cooling fluid therethrough. In other embodiments, composite foam cooling passage 78 may be a single unitary composite foam structure formed into the desired shape, e.g., the serpentine shape depicted in FIG. 5. In one form, composite filler 74 is applied and/or stacked along the entirety of composite foam cooling passage 78, including the volume between composite foam structures 72A, 72B and 72C, except at end faces 82 and 84 of composite foam cooling passage 78, thus sealing the balance of composite foam cooling passage 78 and forming internal portion 64. Cooling fluid may thus be directed to flow into either end face 82 or end face 84, and will exit through the opposite end face 84 or end face 82. For example, cooling air may be directed into end face 82, and will flow through composite foam structure 72A along its length 86, through composite foam structure 72B, which bridges between composite foam structures 72A and 72C, and through composite foam structure 72C, after which the cooling air exits through end face 84.

In one form, the density of the composite foam structure is varied in order to generate one or more desired pressure drops at one or more desired locations in composite foam cooling passage 78, e.g., one or more locations in one or more of composite foam structures 72A, 72B and 72C. For example, assuming composite foam structure 72A was disposed on the hot side of airfoil 60, the density of composite foam structure 72A may be increased at one or more desired locations along its length 86 (or the entirety of length 86) in order to generate an increased pressure drop and hence greater heat transfer to the cooling fluid at such locations (or along the entirety of length 86).

Figure 6:
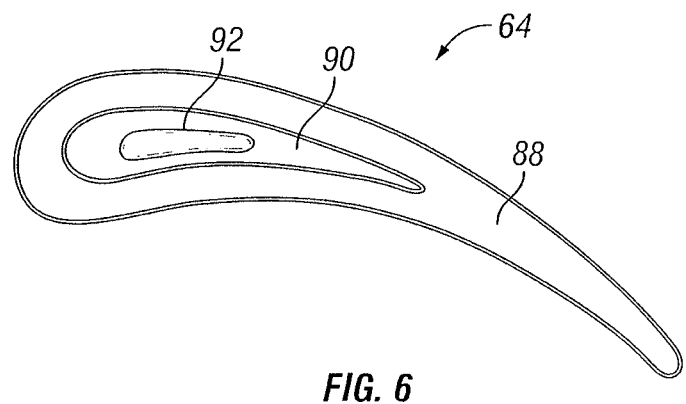
FIG. 6 depicts some aspects of a non-limiting example of an airfoil having a metallic spar in accordance with an embodiment of the present invention.

Referring to FIG. 6 in conjunction with FIG. 2, some aspects of another non-limiting example of internal portion 64 in accordance with an embodiment of the present invention are depicted. For the purpose of simplicity of illustration, external portion 62 is not depicted in FIG. 6. The view of FIG. 6 is from the same perspective as that of FIG. 3. In the embodiment of FIG. 6, internal portion 64 includes a composite foam structure 88 disposed around a metallic spar

90. Composite foam structure 88 and metallic spar 90 form internal portion 64, and are surrounded by external portion 62. In some embodiments, composite filler 74 may be disposed between composite foam structure 88 and external portion 62 and/or between composite foam structure 88 and metallic spar 90 and/or at other locations. In one form, metallic spar 90 is hollow, e.g., having an opening 92 disposed therein. Composite foam structure 88 forms a composite foam cooling passage that is effective for cooling metallic spar 90 and external portion 62.

It will be understood that many variations of composite cooling structures/passages may be employed to accommodate many variations in cooling schemes, for example and without limitation, including employing openings or composite cooling structures, e.g., extending from the composite cooling passages illustrated herein, that provide cooling air to different portions of airfoil 60, e.g., for film cooling, impingement cooling or other cooling schemes. As an example, cooling air may be supplied to a trailing edge gill slot cooling scheme from a composite cooling passage in accordance with an embodiment of the present invention.

Embodiments of the present invention include a method of manufacturing an a component for a turbomachine, comprising: forming an internal portion of the component, including forming a first composite foam structure to a desired shape, wherein the first composite foam structure is configured to pass a cooling fluid therethrough; enveloping the internal portion of the component with composite wrap plies to form a body, without using a removable core support pin to support the internal portion of the component; and rigidizing the body.

In a refinement, the enveloping includes forming the body as an airfoil shape using the composite wrap plies.

In another refinement, the method further comprises stacking one or both of a composite filler tape and a composite filler fabric onto the first composite foam structure to form the internal portion of the component, without using a removable core support pin to support the first composite foam structure.

In yet another refinement, the stacking of the one or both of the composite filler tape and the composite filler fabric onto the first composite foam structure includes applying the one or both of the composite filler tape and the composite filler fabric along a length of the first composite foam structure.

In still another refinement, the method further comprises: forming a second composite foam structure to a desired shape, wherein the second composite foam structure is configured to pass at least some the cooling fluid therethrough; and stacking the one or both of the composite filler tape and the composite filler fabric onto the second composite foam structure in addition to the first composite foam structure to form the internal portion of the component.

In yet still another refinement, the stacking of the one or both of the composite filler tape and the composite filler fabric onto the second composite foam structure in addition to the first composite foam structure includes applying the one or both of the composite filler tape and the composite filler fabric along a length of the first composite foam structure and of the second composite foam structure.

In a further refinement, the stacking of the one or both of the composite filler tape and the composite filler fabric onto the second composite foam structure in addition to the first composite foam structure includes applying the one or both of the composite filler tape and the composite filler fabric between the first composite foam structure and of the second composite foam structure.

In a yet further refinement, the method further comprises: forming a third composite foam structure to a desired shape; wherein the second composite foam structure is configured to pass at least some of the cooling fluid therethrough; and wherein the third composite foam structure is configured to bridge between the first composite foam structure and the second composite foam structure and allow the at least some of the cooling fluid to flow between the first composite foam structure and the second composite foam structure; and stacking the one or both of the composite filler tape and the composite filler fabric onto the third composite foam structure in addition to the first composite foam structure and the second composite foam structure to form the internal portion of the component.

In a yet further refinement, the method further comprises varying the density in at least one of the first composite foam structure, the second composite foam structure and the third composite foam structure to generate an increased pressure drop at a desired location in the at least one of the first composite foam structure, the second composite foam structure and the third composite foam structure.

In a still further refinement, the first composite foam structure, the second composite foam structure and the third composite structure form at least part of a serpentine structure.

In a yet still further refinement, the method further comprises varying the density in the first composite foam structure to generate an increased pressure drop at a desired location in the first composite foam structure.

In an additional further refinement, the first composite foam structure forms at least part of a serpentine structure.

In another further refinement, the forming of the first composite foam structure to the desired shape includes forming the first composite foam structure into a serpentine shape.

In yet another further refinement, the composite is a ceramic matrix composite.

In still another further refinement, the method further comprises incorporating a metallic spar into the internal portion of the component.

Embodiments of the present invention include an airfoil for a turbomachine, comprising: a body having an airfoil shape, wherein the body includes; an internal portion of the airfoil having a composite foam cooling passage configured to pass a cooling fluid therethrough; and a plurality of composite wrap plies enveloping the internal portion of the airfoil.

In a refinement, the airfoil further comprises one or both of a composite filler tape and a composite filler fabric surrounding at least a portion of the composite foam cooling passage, wherein the one or both of the composite filler tape and the composite filler fabric form a part of the internal portion of the airfoil.

In another refinement, the plurality of composite wrap plies form an airfoil shape around the internal portion of the airfoil.

In yet another refinement, the composite foam cooling passage includes a controlled density variation configured to generate an increased pressure drop at a desired location.

In still another refinement, the composite foam cooling passage is formed of a unitary composite foam structure.

In yet still another refinement, the composite foam cooling passage is formed into a serpentine shape.

In a further refinement, the composite foam cooling passage is formed of a plurality of composite foam structures arranged together to form the composite foam cooling passage.

In a yet further refinement, the composite is a ceramic matrix composite.

In a still further refinement, the airfoil further comprises a metallic spar in the internal portion of the airfoil.

In a yet still further refinement, the airfoil further comprises a composite filler surrounding at least a portion of the composite foam cooling passage, wherein the composite filler forms a part of the internal portion of the airfoil.

Embodiments of the present invention include a gas turbine engine, comprising: a compressor; a combustor in fluid communication with the compressor; and a turbine in fluid communication with the combustor, wherein at least one of the compressor and the turbine includes a component having means for cooling the component with a cooling fluid.

In a refinement, the means for cooling the component includes a composite foam cooling passage.

In another refinement, the composite foam cooling passage includes a controlled density variation configured to generate an increased pressure drop at a desired location.

In yet another refinement, the composite is a ceramic matrix composite.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method of manufacturing a component for a turbomachine, comprising:
    forming an internal portion of the component, including forming a first composite foam structure to a first desired shape, forming a second composite foam structure to a second desired shape, and forming a third composite foam structure to a third desired shape, wherein the first composite foam structure comprises a first end face configured to take in a cooling fluid into the first composite foam structure, and wherein the first composite foam structure is configured to pass the cooling fluid therethrough and into the second composite foam structure, the second composite foam structure configured to bridge between the first composite foam structure and the third composite foam structure and allow the cooling fluid to flow between the first composite foam structure and the third composite foam structure, the third composite foam structure configured to pass the cooling fluid therethrough and out of a second end face, the first end face and the second end face positioned on a same side of the component;
    enveloping the internal portion of the component with composite wrap plies to form a body, without using a removable core support pin to support the internal portion of the component; and
    rigidizing the body.

2. The method of claim 1, wherein the enveloping includes forming the body as an airfoil shape using the composite wrap plies.

3. The method of claim 1, further comprising stacking one or both of a composite filler tape and a composite filler fabric onto the first composite foam structure to form the internal portion of the component, without using a removable core support pin to support the first composite foam structure.

4. The method of claim 3, wherein the stacking of the one or both of the composite filler tape and the composite filler fabric onto the first composite foam structure includes applying the one or both of the composite filler tape and the composite filler fabric along a length of the first composite foam structure.

5. The method of claim 3, further comprising:
    stacking the one or both of the composite filler tape and the composite filler fabric onto the second composite foam structure in addition to the first composite foam structure to form the internal portion of the component.

6. The method of claim 5, wherein the stacking of the one or both of the composite filler tape and the composite filler fabric onto the second composite foam structure in addition to the first composite foam structure includes applying the one or both of the composite filler tape and the composite filler fabric along a length of the first composite foam structure and of the second composite foam structure.

7. The method of claim 5, wherein the stacking of the one or both of the composite filler tape and the composite filler fabric onto the second composite foam structure in addition to the first composite foam structure includes applying the one or both of the composite filler tape and the composite filler fabric between the first composite foam structure and of the second composite foam structure.

8. The method of claim 5, further comprising:
    stacking the one or both of the composite filler tape and the composite filler fabric onto the third composite foam structure in addition to the first composite foam structure and the second composite foam structure to form the internal portion of the component.

9. The method of claim 8, further comprising varying the density in at least one of the first composite foam structure, the second composite foam structure and the third composite foam structure to generate an increased pressure drop at a desired location in the at least one of the first composite foam structure, the second composite foam structure and the third composite foam structure.

10. The method of claim 1, further comprising varying the density in the first composite foam structure to generate an increased pressure drop at a desired location in the first composite foam structure.

11. The method of claim 1, wherein the first composite foam structure forms at least part of a serpentine structure; and wherein the forming of the first composite foam structure to the desired shape includes forming the first composite foam structure into a serpentine shape.

12. The method of claim 1, further comprising incorporating a metallic spar into the internal portion of the component.

13. An airfoil for a turbomachine, comprising:
    a body having an airfoil shape, wherein the body includes:
        an internal portion of the airfoil having a composite foam cooling passage configured to pass a cooling fluid into the composite foam cooling passage at a first end face and out of the composite foam cooling passage at a second end face, the first end face and the second end face positioned on a same side of the body; and
a plurality of composite wrap plies enveloping the internal portion of the airfoil.

14. The airfoil of claim 13, further comprising one or both of a composite filler tape and a composite filler fabric surrounding at least a portion of the composite foam cooling passage, wherein the one or both of the composite filler tape and the composite filler fabric form a part of the internal portion of the airfoil.

15. The airfoil of claim 13, wherein the plurality of composite wrap plies form an airfoil shape around the internal portion of the airfoil.

16. The airfoil of claim 13, wherein the composite foam cooling passage includes a controlled density variation configured to generate an increased pressure drop at a desired location.

17. The airfoil of claim 13, wherein the composite foam cooling passage is formed of a unitary composite foam structure.

18. The airfoil of claim 13, wherein the composite foam cooling passage is formed of a plurality of composite foam structures arranged together to form the composite foam cooling passage.

19. The method of claim 13, further comprising a metallic spar in the internal portion of the airfoil.

20. The airfoil of claim 13, further comprising a composite filler surrounding at least a portion of the composite foam cooling passage, wherein the composite filler forms a part of the internal portion of the airfoil.

21. A gas turbine engine, comprising:
a compressor;
a combustor in fluid communication with the compressor; and
a turbine in fluid communication with the combustor,
wherein at least one of the compressor, the combustor and the turbine includes a component having means for cooling the component with a cooling fluid, wherein the means for cooling the component includes a composite foam cooling passage, the composite foam cooling passage including a first end face and a second end face, the first end face being a means for entry of the cooling fluid into the composite foam cooling passage, the second end face being a means for egress of the cooling fluid from the composite foam cooling passage, the first end face and the second end face positioned on a same side of the component.

22. The gas turbine engine of claim 21, wherein the means for cooling the component does not employ a removable core support pin to support the internal portion of the component.

23. The gas turbine engine of claim 21, wherein the composite foam cooling passage includes a plurality of composite foam structures.

24. The gas turbine engine of claim 23, wherein the composite foam cooling passage includes a controlled density variation configured to generate an increased pressure drop at a desired location.

* * * * *